United States Patent [19]

Oshita et al.

[11] Patent Number: 5,711,150
[45] Date of Patent: Jan. 27, 1998

[54] VEHICLE HEIGHT CONTROL SYSTEM FOR CONTROLLING VEHICLE

[75] Inventors: Morito Oshita, Shinbayashi; Masakazu Ozawa, Maebayashi-cho, both of Japan

[73] Assignee: Aisin Seiki Kabushiki Kaisha, Kariya, Japan

[21] Appl. No.: 685,675

[22] Filed: Jul. 24, 1996

[30] Foreign Application Priority Data

Jul. 31, 1995 [JP] Japan ................. 7-194793
Feb. 26, 1996 [JP] Japan ................. 8-38438
Mar. 15, 1996 [JP] Japan ................. 8-59177

[51] Int. Cl.[6] ........................................... F16D 31/02
[52] U.S. Cl. ..................................... 60/407; 60/453
[58] Field of Search ........................ 60/407, 453, 454

[56] References Cited

U.S. PATENT DOCUMENTS 4,082,665  4/1978  Schneider et al. ............ 60/454 X
5,129,927  7/1992  Tsubouchi .
5,467,595  11/1995  Smith ............................ 60/453 X

FOREIGN PATENT DOCUMENTS 2-33866  9/1990  Japan .
5-228329  9/1993  Japan .

OTHER PUBLICATIONS

Kanebo "Bell Oasis" catalog.

*Primary Examiner*—Hoang Nguyen
*Attorney, Agent, or Firm*—Burns, Doane, Swecker & Mathis, LLP

[57] ABSTRACT

A vehicle height control system for controlling vehicle suspension includes an air suspension unit and a compressor for producing compressed air to be supplied to the air suspension unit. An air drying chamber is provided between the compressor and the air suspension unit for drying the compressed air supplied from the compressor to the air suspension unit. An air drying filter is positioned in the air drying chamber for removing water and moisture from the compressed air produced by the compressor and to be supplied to the pneumatic actuator, the air drying filter being a non-woven cloth made of fibers including fibers having water and moisture absorbing performance.

20 Claims, 6 Drawing Sheets

5,711,150

VEHICLE HEIGHT CONTROL SYSTEM FOR CONTROLLING VEHICLE

BACKGROUND OF THE INVENTION

1. Field of the Invention

The present invention relates to a vehicle height control system for controlling vehicle suspension, and more particularly, to a vehicle height control system provided with an air drying filter made of a non-woven cloth which is includes water-absorptive and moisture-absorptive fibers.

2. Description of the Related Art

U.S. Pat. No. 5,129,927 discloses a conventional vehicle height control system for a vehicle suspension in which an aggregation of silica gel particles as an air drying filter is disposed in a cylindrical air drying chamber positioned in a passage communicating a pneumatic actuator such as an air suspension unit to a compressor for removing moisture from the compressed air produced by the compressor and supplied to the pneumatic actuator through the air drying chamber. The compressed air in the pneumatic suspension is exhausted to the atmosphere through an orifice positioned between the pneumatic actuator and the air drying chamber and through the air drying chamber wherein dry air flow flowing from the pneumatic suspension into the air drying chamber is restricted by the orifice so that the pressure in the air drying chamber is decreased to reach nearly atmospheric pressure with, the dry air flowing into the air drying chamber absorbs the moisture which has been absorbed by the silica gel particles thereby to regenerate the silica gel particles.

Upon the operation of the compressor, the greater part of the moisture in the compressed air discharged from an air compressing chamber of the compressor is brought into dews in the passage between the compressor and the air drying chamber. In a case such that the air drying chamber is maintained under high pressure condition, the dews flows into the air drying chamber and contacts the silica gel particles so that the silica gel particles are shattered thereby to cause the reduction of the moisture-absorption performance of the shattered silica gel particles. Also, the moisture absorbing rate of the non-shattered silica gel particles is increased so that silica gel particles does not satisfyingly regenerated in the compressed air exhaust operation. Therefore, it is necessary to design the volume of the silica gel particles in large volume in order to maintain the moisture-absorption performance over a long time thereby to increase the size and weight of the system.

SUMMARY OF THE INVENTION

Accordingly, it is an object of the present invention to provide a vehicle height control system with improved air drying filter which has the capability of reducing the size and weight of the system.

It is another object of the present invention to provide the vehicle height control system with a relatively small number of components, compact size and light weight.

To achieve the above-stated object, according to the present invention, there is provided a vehicle height control system for controlling vehicle suspension comprising: a pneumatic actuator for being connected to a vehicle suspension; a compressor for producing compressed air to be supplied the pneumatic actuator; an air drying chamber for drying the compressed air produced by the compressor, said air drying chamber being connected to the compressor for receiving compressed air from the compressor and being connected to the pneumatic actuator to deliver the compressed air which has passed through the air drying chamber to the pneumatic actuator; and an air drying filter positioned in the air drying chamber for removing water and moisture from the compressed air produced by the compressor and to be supplied to the pneumatic actuator, the air drying filter being a non-woven cloth made of fibers including fibers having water and moisture absorbing performance.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

Preferred embodiments of the present invention will be described hereinafter with reference to the accompanying drawings.

Figure 1:
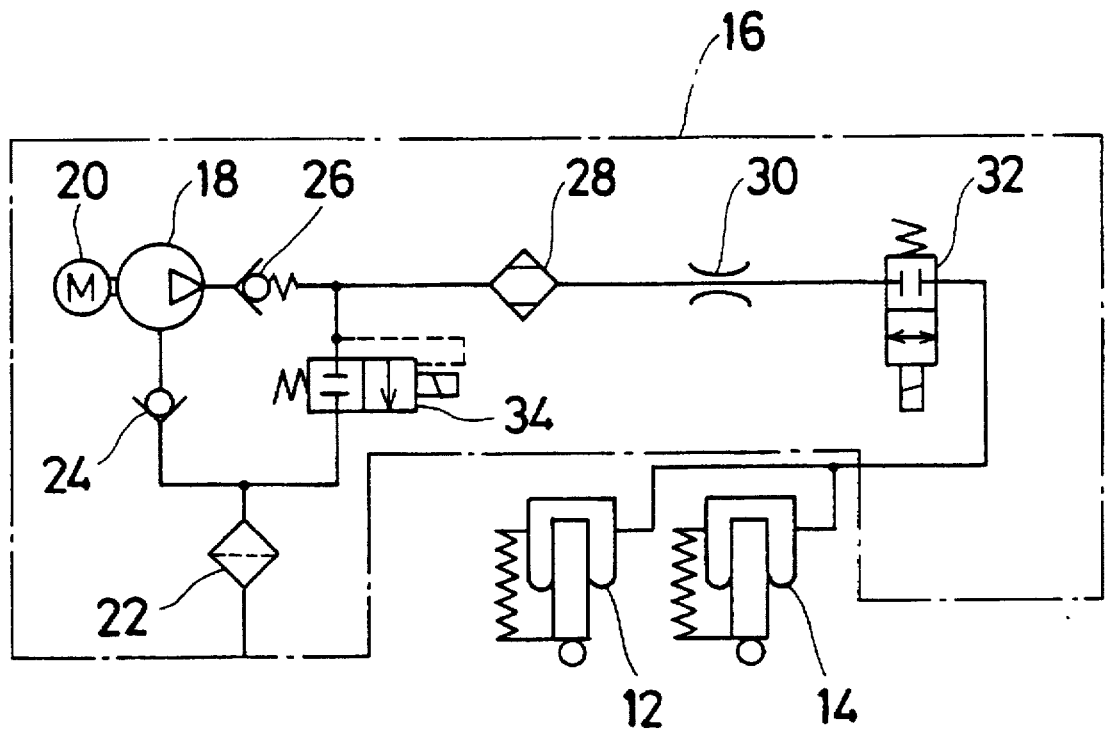
FIG. 1 is a general block diagram illustrating a vehicle height control system according to the present invention.

Referring to FIG. 1, there is shown an arrangement of components for a vehicle height control system, according to an embodiment of the present invention. Air suspension units 12, 14 provided for rear road wheels of a vehicle (not shown) are pneumatically connected to a compressed air control unit 16. The compressed air control unit 16 includes a compressor 18 operatively connected to an electric motor 20 which drives the compressor 18 to suck therein air from the atmosphere through a dust filter 22 and an inlet valve 24, and then compress the air. As arranged in FIG. 1, the air which is compressed by the compressor 18 is discharged from an outlet valve 26 and supplied into the air suspension units 12, 14 through an air drying chamber 28, an orifice 30, and a normally opened supply solenoid valve 32 to increase the height of the vehicle. Also, it is so arranged that the compressed air in the air suspension units 12, 14 is exhausted to the atmosphere through the supply solenoid valve 32, orifice 30, air drying chamber 28, a normally closed exhaust solenoid valve 34, and the dust filter 22 to decrease the height of the vehicle. The exhaust solenoid valve 34 also operates as a pressure relief valve to limit air pressure increasing over a predetermined maximum pressure.

Figure 2:
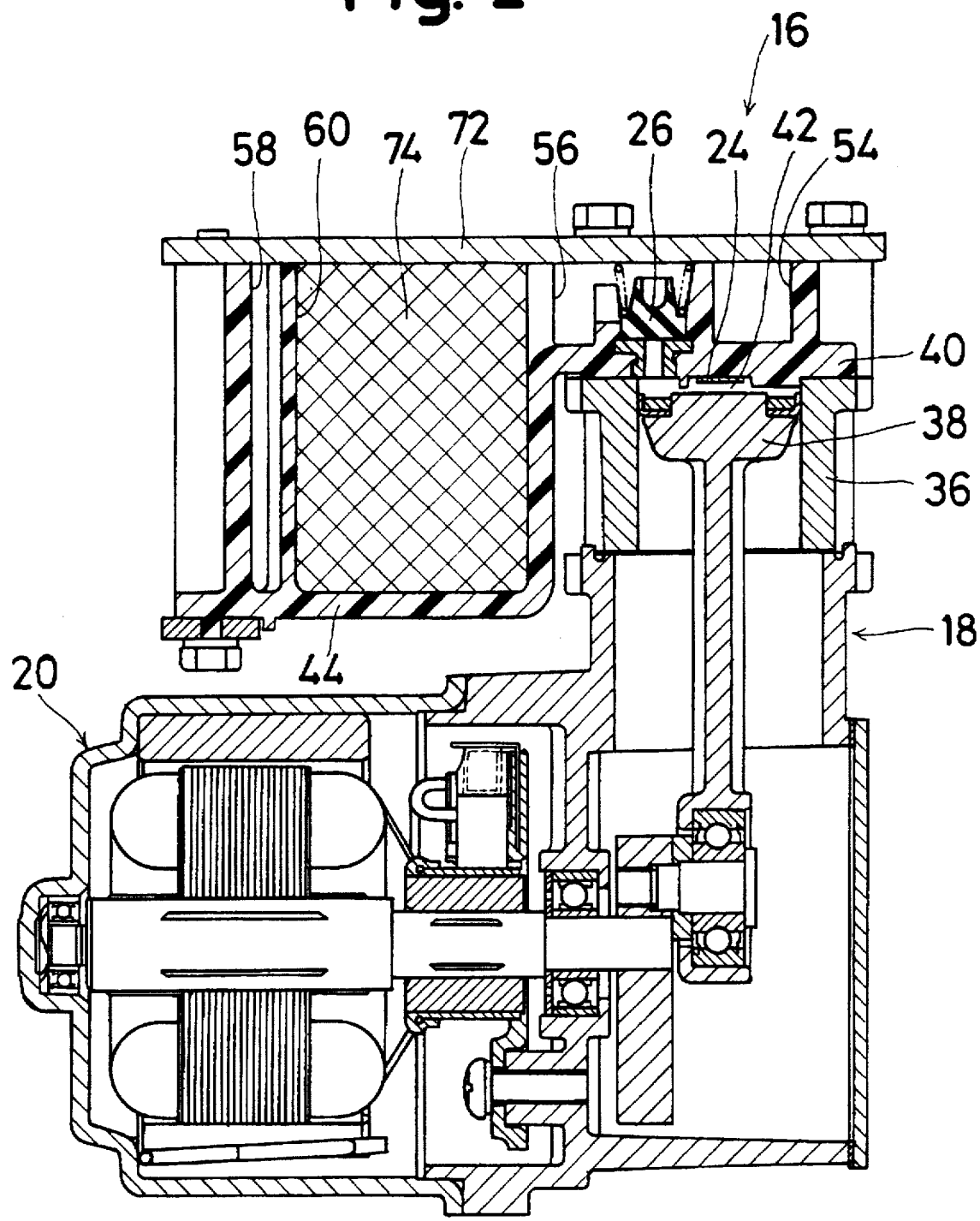
FIG. 2 is a sectional view of a vehicle height control system according to an embodiment of the present invention.
Figure 3:
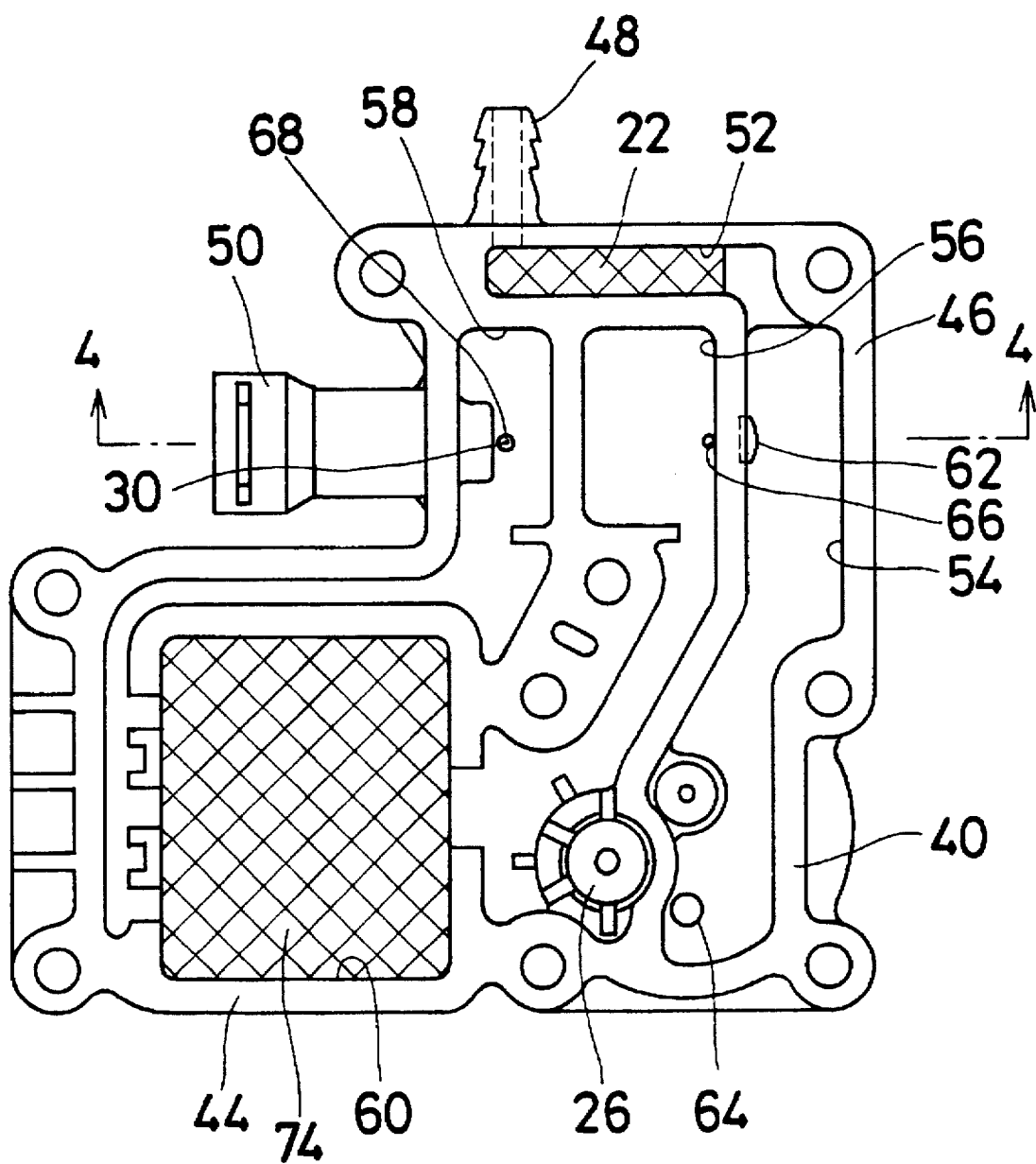
FIG. 3 is a plane view of a cylinder head with an air drying filter and a dust filter of the embodiment.
Figure 4:
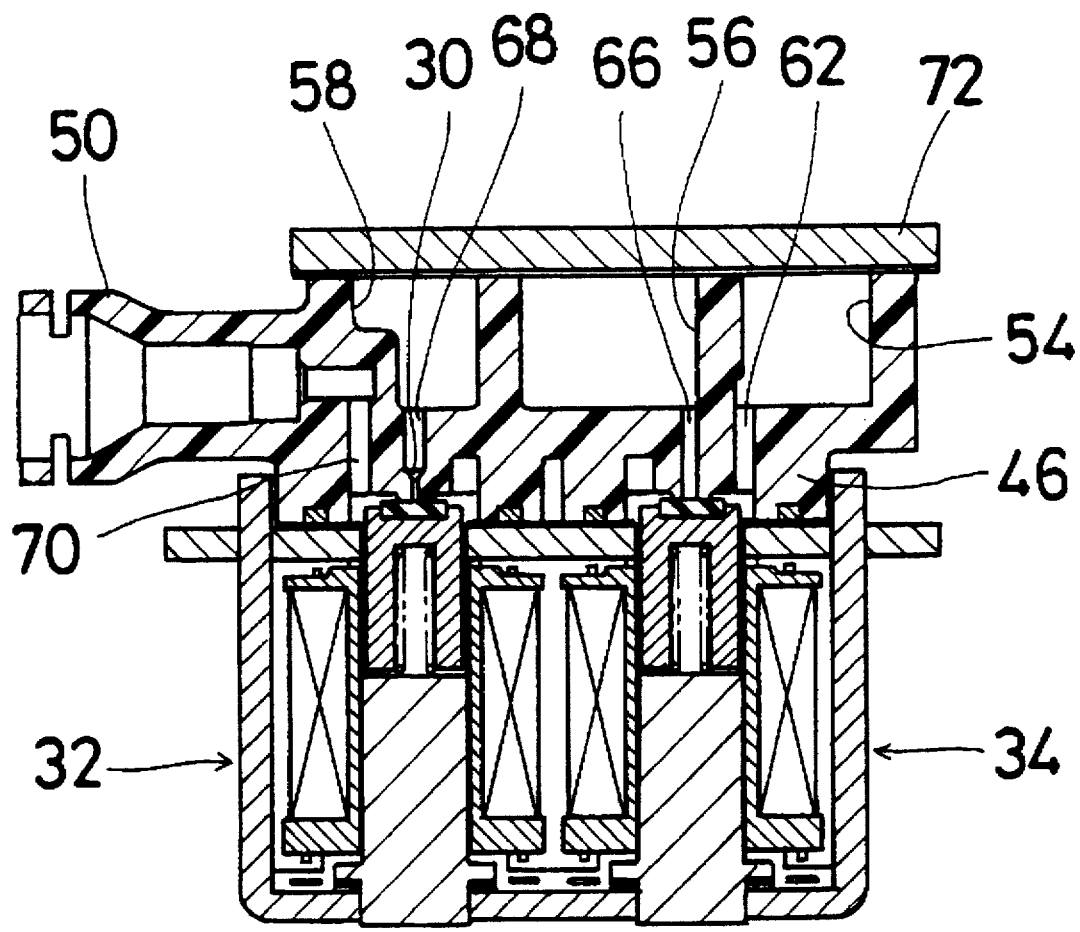
FIG. 4 is a sectional view taken along the line. 4—4 in FIG. 3.

Referring to FIGS. 2 to 4, there is shown a detail arrangement of components for the compressed air control unit 16. The compressor 18 includes a cylinder 36 having a top end opening, and a rocking piston 38 slidably received in the cylinder 38. The rocking piston 38 is operatively connected to the motor 20 so that the rocking piston 38 is driven by the motor 20 to reciprocate in the cylinder 36. A cylinder head 40 is mounted on a top end of the cylinder 36 to close the top end opening of the cylinder 36. An air compressing chamber 42 is defined between the rocking piston 38 and the cylinder head 40.

The cylinder head 40 is made of synthetic resin having a good heat resistance property, and is provided with extended portions 44, 46 extending over a circumferential outer periphery of the cylinder 36 in the radial direction of the cylinder 36. The portions 44, 46 also extend downward over the top end of the cylinder 36. The cylinder head 40 is provided with a connection pipe 48 projecting from an outer periphery of the extended portion 44 for communication with the atmosphere, and a connection pipe 50 projecting from the outer periphery of the extended portion 44 for communication with the air suspension units 12, 14. The cylinder head 40 is further provided with air passages 52, 54, 56 and 58 in the form of grooves on a top end flat surface of the cylinder head 40, and the air drying chamber 28 in the form of a rectangular recess on the top end flat surface of the cylinder head 40.

The air passage 52 and one end of the air passage 54 are located in the extended portion 46 of the cylinder head 40. The air passage 52 is communicated at one end thereof with the connection pipe 48 and also communicated at the other end thereof with one end of the air passage 54. The one end of the air passage 54 is communicated with an outlet 62 for the exhaust solenoid valve 34 which is mounted on a lower end surface of the extended portion 46 of the cylinder head 40. The other end of the air passage 54 is located above the air compressing chamber 42, and is communicated with an inlet 64 for the inlet valve 24 which is positioned in the air compressing chamber, 42 and supported by the cylinder head 40. The dust filter 22 is disposed in the air passage 52.

One end of the air passage 56 is located in the extended portion 46 of the cylinder head 40 and communicated with an inlet 66 for the exhaust solenoid valve 34. The other end of the air passage 56 is located above the air compressing chamber 42 in which the outlet valve 26 is disposed. The other end of the air passage 56 extends into the extended portion 44 of the cylinder head 40 and communicates with one end of the air drying chamber 60. The other end of the air drying chamber 60 is communicated with one end of the air passage 58 the other end of which is communicated with an inlet 68 for the supply solenoid valve 32 which is mounted on the lower end surface of the extended portion 46 of the cylinder head 40. The inlet 68 is provided with the orifice 30 therein, and an outlet 70 for the supply solenoid valve 32 is communicated with the connection pipe 50.

A top cover plate 72 is provided on the top surface of the cylinder head 40 to close the top end openings of the air passages 52, 54, 56 and 58 and the air drying chamber 60.

Figure 5:
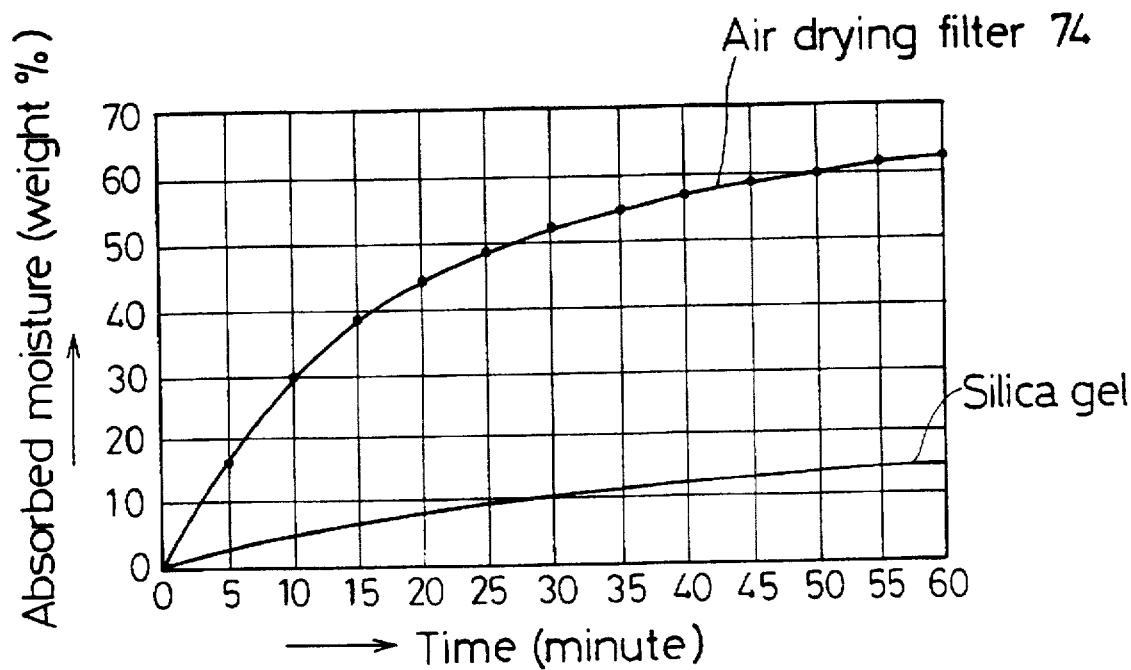
FIG. 5 is a graph showing the experimental water and moisture absorbing properties of the air drying filter of the present invention water and silica gel particles.
Figure 6:
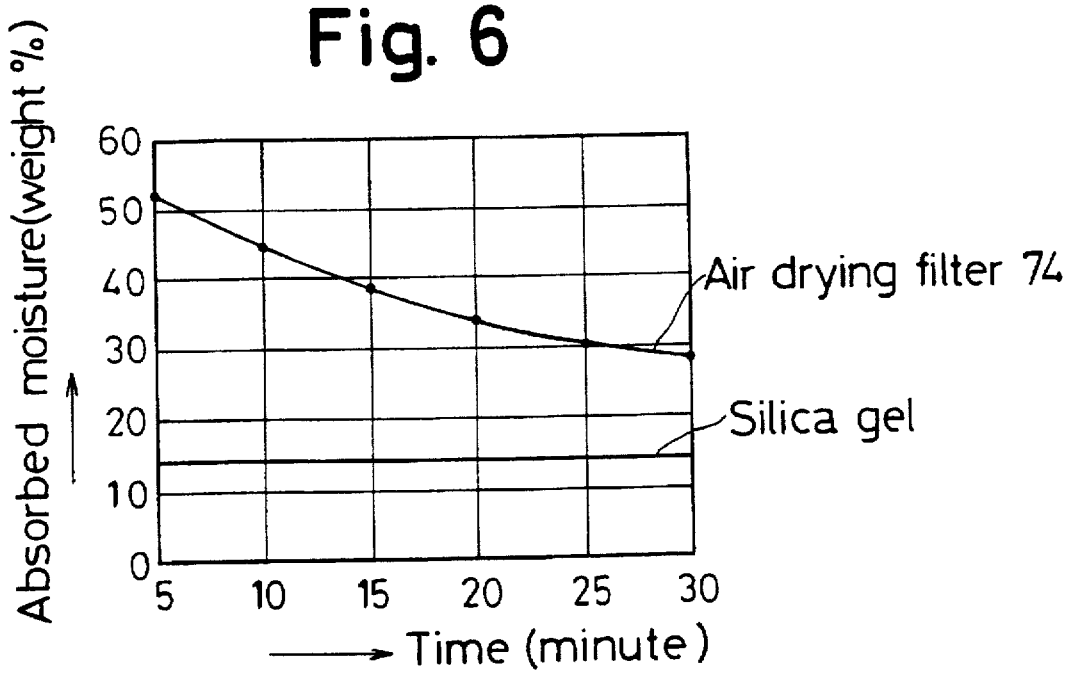
FIG. 6 is a graph showing the experimental regenerative properties of the air drying filter and the silica gel particles.

The air drying chamber 60 has disposed therein an air drying filter 74 formed by a non-woven cloth made of fibers which includes water-absorptive and moisture-absorptive fibers. More specifically, the non-woven cloth is a mixture of 30 weight percent of 9 denier "Bell Oasis" (Trade Mark) sold by Kanebo Ltd. in Japan as water-absorptive and moisture-absorptive fiber and 70 weight percent of 4 denier polyester fibers. The air drying filter 74 has a water and moisture absorbing property higher than that of the silica gel particles as shown in FIG. 5. In an experiment relating to FIG. 5, samples are located in atmosphere having a temperature at 30 Celsius degrees and humidity at 90 percent. Also, the air drying filter 74 has a regenerative property higher than that of the silica gel particles as shown in FIG. 6. In an experiment relating to FIG. 6, samples are located in atmosphere having a temperature at 20 Celsius degrees and humidity at 50 percents.

In operation, when the height of the vehicle is to be raised, for example, the exhaust solenoid valve 34 is held to be closed so as to shut off the air passage 56 from the air passage 54, while the supply solenoid valve 32 is energized to open the communication between the air passage 58 and the connection pipe 50 through the orifice 30. At the same time, the compressor 18 is operated to move the piston 38 downward within the cylinder 36, so that the pressure in the air compressing chamber 42 is decreased. When the pressure in the air compressing chamber 42 becomes less than the predetermined pressure, the inlet valve 24 is opened to suck the air from the passage 54. In contrast, when the piston 38 moves upward within the cylinder 36, the air in the air compressing chamber 42 is compressed. Consequently, when the pressure in the air compressing chamber 42 becomes greater than, the predetermined pressure, the outlet valve 26 is opened to discharge the compressed air into the air passage 56, so that the compressed air flows into the air drying chamber 60. Then, the compressed air flows into the air passage 58 through the air drying filter 74 which removes the moisture from the compressed air to dry the compressed air. The compressed air flowing into the passage 58 further flows into the air suspension units 12, 14 through the orifice 30, the supply solenoid valve 32 and the connection pipe 50 thereby to raise the height of the vehicle in accordance with the conventional manner. When the height of the vehicle reaches a desired height, the motor 20 is stopped and supply solenoid valve 32 is de-energized to close the communication between the air passage 58 and the connection pipe 50. Dews generated in the air passage 56 when the compressed air is discharged from the air compressing chamber 42 into the air passage 56, and flowing from the air passage 56 into the air drying chamber 60 is absorbed by the air drying filter 74.

In the case where the height of the vehicle is to be reduced, the supply solenoid valve 32 and the exhaust solenoid valve 34 are energized to open the communication between the air passage 58 and the connection pipe 50 and the communication between the air passage 54 and 56, so that the compressed dry air in the air suspension units 12, 14 is discharged to the atmosphere through the connection pipe 50, the supply solenoid valve 32, the orifice 30, the air passage 58, air drying chamber 60, the air passage 56, the exhaust solenoid valve 34, the air passage 54, the air passage 52, and the connection pipe 48. Because the compressed air flow flowing from the connection pipe 50 into the air passage 58 is restricted by the orifice 30, the pressure in the air drying chamber 60 is decreased to reach nearly the atmospheric pressure, the dry air flowing into the air drying chamber 60 absorbs the water and moisture which has been absorbed by the air drying filter 74, so that the air drying filter 74 is regenerated. When the height of the vehicle reaches a desired height, the supply solenoid vale 32 and the exhaust solenoid valve 34 are de-energized to close the communication between the connection pipe 50 and the air passage 58 and the communication between the air passage 54 and the air passage 56.

Figure 7:
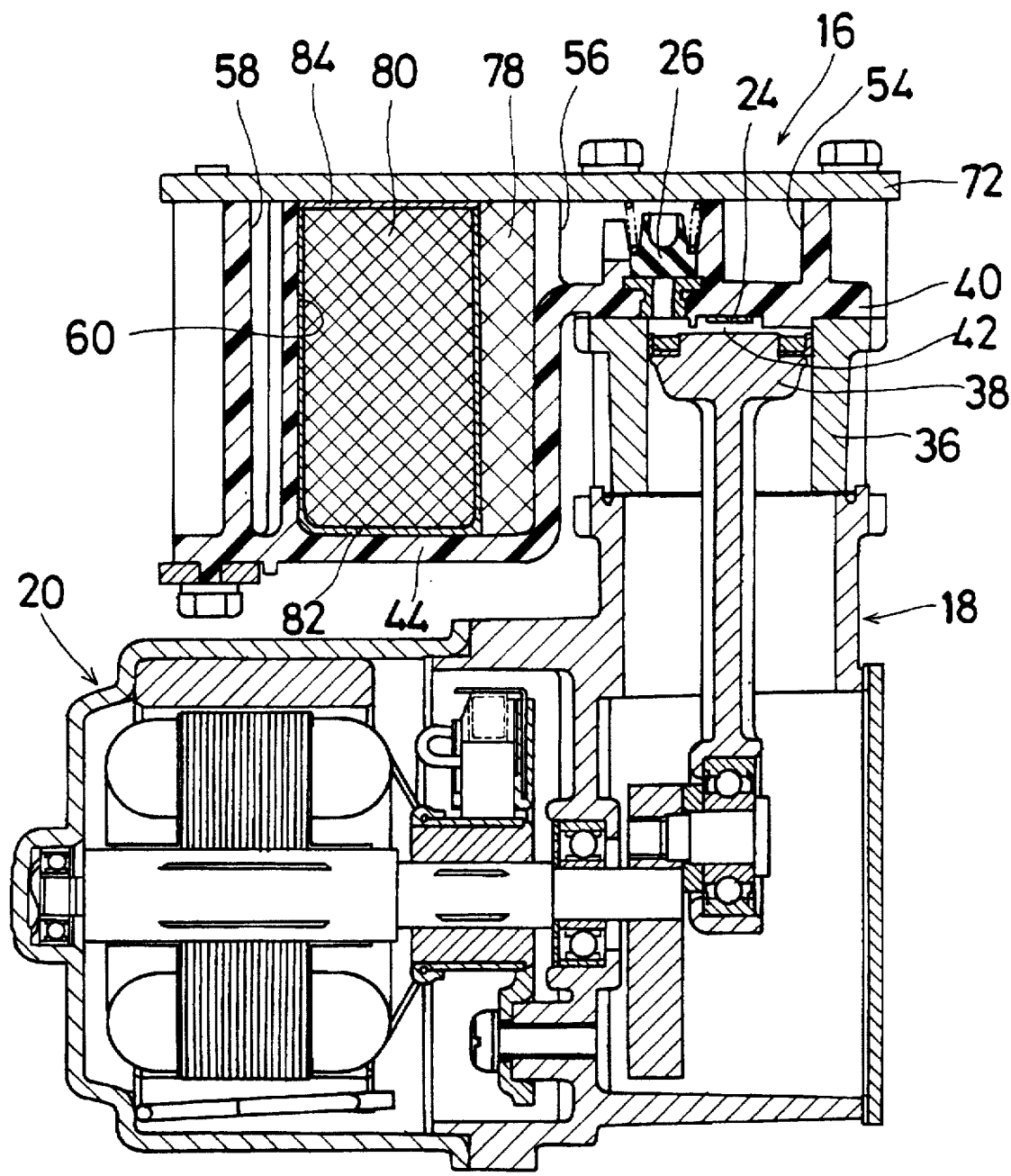
FIG. 7 is a sectional view of a vehicle height control system according to another embodiment of the present invention.

Referring to FIG. 7, there is shown a detail arrangement of the components for a compressed air control unit of another embodiment of a vehicle height control system according to the present invention. The compressed air control unit 76 the same as the compressed air control unit 16 without air drying filters 78, 80 disposed in the air drying chamber 60. The air drying filter 78 is made of a material that is the same as the material of the air drying filter 74, and is located at one end side of the air drying chamber 60. The air drying filter 80' is an aggregation of silica gel particles enclosed in a casing or cartridge 82 made of a non-woven cloth made of polyester fibers. A top end opening of the casing 82 is closed by a cover 84 made of a material that is the same as the material of the casing 82. The cover 82 is welded to the casing 82 by a conventional heat welding manner after the silica gel particles are disposed in the casing 82. The air drying filter 78 is connected to the casing 82 to form an air drying filter unit which is removably located in the air drying chamber 60. The air drying filter 78 removes the moisture from the compressed air at a high level at humidity flowing from the air passage 56 into the air passage 58 through the air drying chamber 60 to decrease the humidity of the compressed air below about 40 percent, and the air drying filter 80 removes the moisture from the compressed air which has had the greater part of the moisture removed by the air drying filter 78 to further decrease the humidity of the compressed air, so that the compressed air to be supplied to the air suspension units is brought into sufficiently dry state. The air drying filter 78 absorbs the dews flown from the air passage into the air drying chamber 60 to prevent the air drying filter 80 from contact with the dews.

While the present invention has been described with reference to what are presently considered to be preferred embodiments thereof, it is to be understood that the invention is not limited to the disclosed embodiments. To the contrary, the invention is intended to cover various modifications and equivalent arrangements included within the spirit and scope of the appended claims.

What is claimed is:

1. A vehicle height control system for controlling vehicle suspension comprising:
    a pneumatic actuator for being connected to a vehicle suspension;
    a compressor for producing compressed air to be supplied to the pneumatic actuator, said compressor including a cylinder having an open end and a piston positioned within the cylinder for defining an air compressing chamber, and including a plate which extends over the open end of the cylinder to close the open end of the cylinder;
    an air drying chamber for drying the compressed air produced by the compressor, said air drying chamber being defined in part by the plate, said air drying chamber being connected to the compressor for receiving compressed air from the compressor and being connected to the pneumatic actuator to deliver the compressed air which has passed through the air drying chamber to the pneumatic actuator; and
    an air drying filter positioned in the air drying chamber for removing water and moisture from the compressed air produced by the compressor and to be supplied to the pneumatic actuator.

2. A vehicle height control system as claimed in claim 1, wherein said air drying filter is a non-woven cloth made of fibers including fibers having water and moisture absorbing performance.

3. A vehicle height control system as claimed in claim 2, wherein said air drying filter is a first air drying filter, and including a second air drying filter positioned in said air drying chamber, said second air drying filter being made of a material different from said first air drying filter material and being positioned between said first air drying filter and said pneumatic actuator.

4. A vehicle height control system as claimed in claim 3, wherein said second air drying filter is an aggregation of air drying agent particles.

5. A vehicle height control system as claimed in claim 4, wherein the air drying agent particles are enclosed in a casing positioned in the air drying chamber.

6. A vehicle height control system as claimed in claim 5, wherein said casing is made of a non-woven cloth.

7. A vehicle height control system as claimed in claim 3, wherein said second air drying filter is disposed in a cartridge positioned in the air drying chamber.

8. A vehicle height control system as claimed in claim 7, wherein said cartridge is removably positioned in the air drying chamber.

9. A vehicle height control system as claimed in claim 1, including a connecting passage formed in the plate and in communication with the air drying chamber so that compressed air which has passed through the air drying chamber flows through the connecting passage for being supplied to the pneumatic actuator.

10. A vehicle height control system as claimed in claim 1, including supply valve means for controlling the compressed air to be supplied to the pneumatic actuator from the compressor, and exhaust valve means for controlling the compressed air to be discharged from the pneumatic actuator into the atmosphere.

11. A vehicle height control system for controlling vehicle suspension comprising:
    a pneumatic actuator for being connected to a vehicle suspension;
    a compressor for producing compressed air to be supplied the pneumatic actuator, said compressor including a cylinder having a top end opening, a cylinder head closing the top end opening of the cylinder, a piston slidably disposed in the cylinder to define an air compressing chamber, an inlet valve for introducing air into the air compressing chamber, and an outlet valve for discharging the compressed air;
    an air drying chamber deformed in part by the plate for drying the compressed air produced by the compressor, said air drying chamber being connected to the compressor for receiving compressed air from the compressor and being connected to the pneumatic actuator to deliver the compressed air which has passed through the air drying chamber to the pneumatic actuator; and
    an air drying filter positioned in the air drying chamber for removing water and moisture from the compressed air produced by the compressor and to be supplied to the pneumatic actuator,
    the cylinder head of the compressor being expanded over a circumferential outer periphery of the cylinder and being provided with: a first passage for communicating the inlet valve of the compressor with atmosphere; the air drying chamber; and a second passage for communicating the outlet valve of the compressor with the air drying chamber and through which flows compressed air that has passed through the air drying chamber for being supplied to the pneumatic actuator.

12. A vehicle height control system as claimed in claim 11, wherein said air drying filter is a non-woven cloth made of fibers including fibers having water and moisture absorbing performance.

13. A vehicle height control system as claimed in claim 12, wherein said air drying filter is a first air drying filter, and including a second air drying filter positioned in said air drying chamber, said second air drying filter being made of a material different from said first air drying filter material and being positioned between said first air drying filter and said pneumatic actuator.

14. A vehicle height control system as claimed in claim 13, wherein said second air drying filter is an aggregation of air drying agent particles.

15. A vehicle height control system as claimed in claim 14, wherein the drying agent particles are enclosed in a casing positioned in the air drying chamber.

16. A vehicle height control system for controlling vehicle suspension comprising:

a pneumatic actuator for being connected to a vehicle suspension;

a compressor for producing compressed air to be supplied the pneumatic actuator, said compressor including a cylinder having a top end opening, a cylinder head closing the top end opening of the cylinder, a piston slidably disposed in the cylinder to define an air compressing chamber, an inlet valve mounted on the cylinder head for introducing air into the air compressing chamber, and an outlet valve mounted on the cylinder head for discharging the compressed air;

supply valve means for controlling the compressed air to be supplied to the pneumatic actuator from the compressor;

exhaust valve means for controlling the compressed air to be discharged from the pneumatic actuator to atmosphere;

an air drying chamber defined by the plate for drying the compressed air produced by the compressor, said air drying chamber being connected to the compressor for receiving compressed air from the compressor and being connected to the pneumatic actuator to deliver the compressed air which has passed through the air drying chamber to the pneumatic actuator; and an air drying filter positioned in the air drying chamber for removing water and moisture from the compressed air produced by the compressor and to be supplied to the pneumatic actuator, the cylinder head of the compressor being expanded over a circumferential outer periphery of the cylinder, the supply valve means and the exhaust valve means being mounted on the cylinder head, the cylinder head of the compressor being provided with: a first passage for communicating the inlet valve of the compressor with atmosphere; the air drying chamber; a second passage for communicating the outlet valve of the compressor with one end of the air drying chamber and communicating the one end of the air drying chamber with the atmosphere through the exhaust valve means; and a third passage for communicating the other end of the air drying chamber with the pneumatic actuator through the supply valve means, the third passage being provided with an orifice.

17. A vehicle height control system as claimed in claim 16, wherein said air drying filter is a non-woven cloth made of fibers including fibers having water and moisture absorbing performance, said air drying filter being a first air drying filter, and including a second air drying filter positioned in said air drying chamber, said second air drying filter being made of a material different from said first air drying filter material and being positioned between said first air drying filter and said pneumatic actuator.

18. A vehicle height control system as claimed in claim 16, wherein the cylinder head is provided with a flat top surface, the first, second and third passages being in the form of grooves formed on the flat top surface of the cylinder head, the air drying chamber being in the form of a recess formed on the flat top surface of the cylinder head, and a cover plate is provided on the flat top surface of the cylinder head for closing the first, second, and third passages and the air drying chamber.

19. A vehicle height control system as claimed in claim 16, wherein the air drying chamber and the air drying filter possess a rectangular shape.

20. A vehicle height control system as claimed in claim 17, wherein said second air drying filter is an aggregation of air drying agent particles.

* * * * *